(12) United States Patent
Shimizu

(10) Patent No.: US 9,146,827 B2
(45) Date of Patent: Sep. 29, 2015

(54) SUPPORT SYSTEM

(75) Inventor: Yuki Shimizu, Hadano (JP)

(73) Assignee: Hitachi, Ltd., Tokyo (JP)

( * ) Notice: Subject to any disclaimer, the term of this patent is extended or adjusted under 35 U.S.C. 154(b) by 209 days.

(21) Appl. No.: 13/993,565

(22) PCT Filed: Dec. 13, 2010

(86) PCT No.: PCT/JP2010/072414
§ 371 (c)(1),
(2), (4) Date: Sep. 3, 2013

(87) PCT Pub. No.: WO2012/081080
PCT Pub. Date: Jun. 21, 2012

(65) Prior Publication Data
US 2013/0339810 A1    Dec. 19, 2013

(51) Int. Cl.
*G06F 11/00* (2006.01)
*G06F 11/32* (2006.01)
*G06F 17/50* (2006.01)

(52) U.S. Cl.
CPC .............. *G06F 11/324* (2013.01); *G06F 17/50* (2013.01); *G06F 2217/04* (2013.01)

(58) Field of Classification Search
CPC ... G06F 11/324; G06F 17/50; G06F 2217/04; H04L 41/16; H04L 41/22
See application file for complete search history.

(56) References Cited

U.S. PATENT DOCUMENTS

| | | | |
|---|---|---|---|
| 6,751,661 B1 * | 6/2004 | Geddes | 709/223 |
| 6,847,916 B1 * | 1/2005 | Ying | 702/183 |
| 7,092,771 B2 * | 8/2006 | Retlich et al. | 700/72 |
| 8,612,372 B2 * | 12/2013 | Gotoh et al. | 706/16 |
| 2003/0101261 A1 * | 5/2003 | Ikeda et al. | 709/224 |

(Continued)

FOREIGN PATENT DOCUMENTS

| | | | |
|---|---|---|---|
| JP | 2000-293552 A | 10/2000 | |
| JP | 2005-107773 A | 4/2005 | |
| JP | 2007-323219 A | 12/2007 | |

(Continued)

OTHER PUBLICATIONS

English translation of International Preliminary Report on Patentability (PCT/IPEA/409) Dated Jun. 13, 2013 (Six (6) Pages).

(Continued)

*Primary Examiner* — Charles Ehne
(74) *Attorney, Agent, or Firm* — Crowell & Moring LLP

(57) ABSTRACT

Disclosed is a design support system capable of fully keeping tabs on the components that can be affected by the design change of a given component. The system includes a component name database; a relevant information database that at least includes, in relation to each failure event, the name of tier-one component having failed and the name of tier-two component possibly affecting the failure of the tier-one component; a component network generation unit that, based on the data stored in the component name database and the relevant information database, generates data of a component network covering names of components as well as relevance between components; a component network database storing the component network data; and a component network diagram display control unit that reads data from the component network database and causes a screen display unit of a computer to display a component network diagram based on the read data.

15 Claims, 15 Drawing Sheets

(56) References Cited

U.S. PATENT DOCUMENTS

2008/0082527 A1 4/2008 Yachiku et al.
2008/0126920 A1 5/2008 Otaka et al.

FOREIGN PATENT DOCUMENTS

| JP | 2008-84242 A | 4/2008 |
| JP | 2008-102758 A | 5/2008 |
| JP | 2008-209988 A | 9/2008 |

OTHER PUBLICATIONS

Japanese-language Written Opinion dated Feb. 22, 2011 with English translation (Four (4) pages).

International Search Report dated Feb. 22, 2011 with English translation (Four (4) pages).

\* cited by examiner

FIG. 4

| ID | EVENT NAME | SYNONYM |
|---|---|---|
| 1 | SHORTAGE OF OUTPUT | DROP IN OUTPUT |
| 2 | ABNORMAL HEATING | · · · |
| 3 | CRACKS | · · · |
| 4 | TEMPERATURE RISE | · · · |
| · · · | · · · | · · · |
| · · · | · · · | · · · |

FIG. 5

| ID | COMPONENT NAME | SYNONYM |
|---|---|---|
| 1 | FAN | VENTILATOR |
| 2 | POWER SUPPLY | · · · |
| 3 | PUMP | · · · |
| 4 | ELECTRICAL HEATER | · · · |
| · · · | · · · | · · · |
| · · · | · · · | · · · |

FIG. 6

| TITLE | NAME OF TIER-ONE COMPONENT | EVENT NAME | NAME OF TIER-TWO COMPONENT | INFLUENCE RATE | COUNTERMEASURE | TEXT VECTOR |
|---|---|---|---|---|---|---|
| FAILURE EVENT 1 | PUMP | DROP IN OUTPUT | FAN, POWER SUPPLY | 5 | POWER SUPPLY FOR FAN IS PROVIDED INDEPENDENTLY OF POWER SUPPLY FOR PUMP. | $F_1$ |
| FAILURE EVENT 2 | ELECTRICAL HEATER | ABNORMAL HEATING | POWER SUPPLY | 3 | CONNECTING METHOD IS VERIFIED. | $F_2$ |
| ⋮ | ⋮ | ⋮ | ⋮ | ⋮ | ⋮ | ⋮ |
| ⋮ | PUMP | ⋮ | COMPONENT NAME A, COMPONENT NAME B, COMPONENT NAME C | 3 | ⋮ | ⋮ |
| ⋮ | ELECTRICAL HEATER | ⋮ | COMPONENT NAME D | 1 | ⋮ | ⋮ |
| ⋮ | ⋮ | ⋮ | ⋮ | ⋮ | ⋮ | ⋮ |

FIG. 8

| | FAN | POWER SUPPLY | PUMP | ELECTRICAL HEATER | ... | COMPONENT A | COMPONENT B | COMPONENT C | COMPONENT D | ... |
|---|---|---|---|---|---|---|---|---|---|---|
| FAN | | 1 | 1 | | | | | | | |
| POWER SUPPLY | 1 | | 1 | 1 | | | | | | |
| PUMP | 1 | 1 | | | | | | | | |
| ELECTRICAL HEATER | | | | | | | | | | |
| ... | | | | | | | | | | |
| COMPONENT A | | | 1 | | | | 1 | | | |
| COMPONENT B | | | 1 | | | 1 | | 1 | | |
| COMPONENT C | | | 1 | | | 1 | 1 | | | |
| COMPONENT D | | | | 1 | | | | | | |
| ... | | | | | | | | | | |

12

The output specifications of the power supply for the fan are as follows:

· XXXXXXX
· XXXXXXX
· XXXXXXX
· XXXXXXX of a product, analyzing its effects on the product and extracting the cause of the failure (e.g., see Patent Document 1). This support apparatus is designed to prepare FMEA sheets. An FMEA sheet contains such items as the name of a component, the function of the component, the mode in which the component failed (failure mode), the effects of the feature on the product, the influence rate of the failure, the cause of the failure, the incidence rate of the failure, design management for failure prevention, the defection rate of the failure, and the importance of the failure (=influence rate×incidence rate×detection rate). Specifically, the sheet may describe, as one record depicting "batteries" as a component constituting part of a product "electric torch" for example, the function of "supplying a miniature bulb with power", the failure mode in which "the supply of power is cut off", the effects of the failure entailing "no light", the cause of the failure as "dead batteries", and design management involving "verifying the remaining battery level."

SUPPORT SYSTEM

TECHNICAL FIELD

The present invention relates to a design support system for supporting design work. More particularly, the invention relates to a design support system which, when any component of an existing product is changed in design, presents other components that may be affected by the design change.

BACKGROUND ART

Heretofore, there has been disclosed apparatus for supporting FMEA (Failure Mode and Effects Analysis) work that involves predicting a possible failure The support apparatus is explained below in detail. A storage device of the support apparatus stores function model data made up of a function deployment section and a component list section, the function deployment section representing broken-down functions in tiers for implementing the functionality of the product. In the function model data, function nodes as elements of the function deployment section are relevant to component nodes as elements of the component list section. Also in the function deployment section, failure mode nodes and failure-affected nodes are input in relation to the function nodes. And in the component list section, failure cause data is input in relation to the component nodes, and design management data is input in relation to the failure cause data. The failure-affected nodes are accompanied by input influence rates; the failure cause data is accompanied by input incidence rates, and the design management data is accompanied by input detection rates.

And the support apparatus displays on a display device the above-described function model data, and prepares FMEA-related data based on the function model data. For example, upon preparation of one FMEA record, the designer first selects a failure mode node from the function model data and inputs the selected node to the FMEA record. This triggers a search through the function model data for the function nodes relevant to the failure mode node in question, automatically listing the failure-affected nodes relevant to the function nodes. Thereafter, the designer selects the relevant failure-affected node from the list and adds the selected node to the above FMEA record. And the component nodes relevant to the above-mentioned function nodes are automatically listed. The designer then selects the relevant component node from the list and adds the selected node to the above-mentioned FMEA record. The failure cause data relevant to the above component node is also listed automatically. The designer then selects the relevant failure cause data from the list and adds the selected data to the above FMEA record. The design management data relevant to the above component node is also listed automatically. The designer then selects the relevant design management data from the list and adds the selected data to the above-mentioned FMEA record. As a result, one FMEA record is prepared which includes such information as the failure mode, effects of the failure, influence rate, components involved, cause of the failure, incidence rate, design management, and detection rate.

PRIOR ART LITERATURE

Patent Document

Patent Document 1: JP-2007-323219-A

SUMMARY OF THE INVENTION

Problem to be Solved by the Invention

In recent years, designers have often carried out their design work on the computer. Specifically, they utilize document preparation tools in preparing such design documents as design materials and specifications as well as 3D CAD (Computer Aided Design) in creating three-dimensional geometry data. Also, the designers store such data as design documents and three-dimensional geometry data into databases and retrieve necessary data therefrom for display.

Incidentally, design work may involve studying the change of components in an existing product. In such cases, it is necessary for the study to take into account the possible effects of the component change on other components (relevant components), which can entail irregularities. However, relying solely on the skill and experience of designers for such consideration may not be sufficient for checking all relevant components.

One way of solving this problem is by utilizing the above-mentioned FMEA sheets to keep tabs on the relevant components. However, since the FMEA sheets are used to analyze the failure mode per component, the designers must interpret the sheets to determine the relevance between components, which has turned out to be a burden on them. Even if the relevance between components is found based on the commonality of their failure modes (or functions) from the FMEA sheets, the finding is not sufficient. That is, since the function model data has failure modes and component nodes relevant to one another via function nodes as mentioned above (i.e., component nodes are relevant to one another via function nodes), solely the direct relevance between components such as their functions can be understood from the FMEA sheets prepared based on the function model data. In practice, however, some components located near the design-changed component may well be affected thereby resulting in irregularities. Also, not only the components relevant to the design-changed component via one function but also components relevant thereto via other functions may be affected thereby, which can further lead to irregularities.

An object of the present invention is to provide a design support system capable of fully keeping tabs on the components that can be affected by the design change of a given component.

Means for Solving the Problem (1) In achieving the above-mentioned object, there is provided as a first invention a design support system for presenting components to be affected by design change of a component in an existing product, the design support system including: a component name database which stores the names of components making up the product; a relevant information database which stores data which is generated based on past failure events of the product, the data at least including, in relation to each of the failure events, the name of a tier-one component having failed and the name of a tier-two component having presumably affected the failure of the tier-one component or been affected thereby; component network generation means which, based on the data stored in the component name database and the relevant information database, generates data of a component network covering the names of the components making up the product as well as relevance between these components; a component network database which stores the data generated by the component network generation means; and component network diagram display control means which reads data from the component network database and causes a screen display unit to display a component network diagram based on the read data.

According to the invention outlined above, there is generated data of a component network based on past failure events of the product, or more particularly, on the basis of the relevance between the tier-one components having failed and the tier-two components having presumably affected the failures of the tier-one components or been affected thereby. A component network diagram derived from the data is then displayed on the screen display unit. This structure makes it possible to fully keep tabs on the components that can possibly fail following the design change of a given component.

(2) Preferably, the design support system described in paragraph (1) above may further include an event name database which stores the event names of failures that may occur in product components; a failure event database which stores failure event documents each describing, in relation to each of the past failure events having occurred in the product, the name of the tier-one component having failed, the event name of the failure, the name of the tier-two component having presumably affected the failure of the tier-one component or been affected thereby, an influence rate indicative of the scope of damage caused by the failure, and a countermeasure against the failure; and relevant information extraction means which, from each of the failure event documents stored in said failure event database, extracts the event name of the failure by matching the data stored in the event name database, extracts the names of the tier-one and tier-two components by matching the data stored in the component name database, and further extracts the influence rate of and the countermeasure against the failure so as to generate data having, in relation to each of the failure events, the event name of the failure, the name of the tier-one component, the name of the tier-two component, the influence rate, and the countermeasure against the failure. The relevant information database stores the data generated by the relevant information extraction means.

(3) Preferably, the design support system described in paragraph (2) above may further include first relevant information display control means which, if any one of the names of the components displayed on the component network diagram is selected, searches the data stored in the relevant information database for the failure events including the selected component name as the name of a tier-one component, and displays on the component network diagram the event name of the failure in the searched failure events and the countermeasure against the failure.

The structure above makes it possible to keep tabs on the failures that occurred in the components in the past and on the countermeasures taken against the failures.

(4) Preferably, the design support system described in paragraph (2) or (3) above may further include: selection means which selects a design-changed component; importance calculation means which acquires the components relevant to the design-changed component selected by the selection means on the basis of the data stored in the component network database so as to calculate the importance of each of the relevant components; and second relevant information display control means which highlights in the component network diagram the name of the design-changed component selected by the selection means, and displays the names of the relevant components related to the design-changed component in a gradually highlighted manner in accordance with the importance calculated by the importance calculation means.

The structure above makes it possible to keep tabs on the order in which the relevant components to be considered are prioritized.

(5) Preferably, in the design support system described in paragraph (4) above, the selection means may match the name of the component described in a design document currently displayed on the screen display unit against the data stored in the component name database so as to extract selectively the matched component as the design-changed component.

(6) Preferably, in the design support system described in paragraph (5) above, for each of the relevant components, the importance calculation means may search the data stored in the relevant information database for the failure events including the name of the relevant component as either the name of the tier-one component or the name of the tier-two component so as to calculate a sum total "a" of the influence rates of the searched failure events; calculate a total number "b" of the components relevant to the relevant component based on the data stored in the component network database; use a text vector of the failure event document including the name of the relevant component as either the name of the tier-one component or the name of the tier-two component and a text vector of the design document currently displayed on the screen display unit so as to calculate a similarity "c" between the failure event document and the design document, or to calculate a similarity average "c'" if a plurality of similarities "c" are obtained because there exist a plurality of failure event documents; and calculate the importance of the relevant component by integrating the sum total "a" of the influence rates thereof, the number of the components "b," and the similarity "c" or similarity average "c'."

(7) Preferably, in the design support system described in paragraph (4) above, the selection means may select the design-changed component from the component network diagram.

(8) Preferably, in the design support system described in paragraph (7) above, for each of the relevant components, the importance calculation means may search the data stored in the relevant information database for the failure events including the name of the relevant component as either the name of the tier-one component or the name of the tier-two component so as to calculate a sum total "a" of the influence rates of the searched failure events; calculate a total number "b" of the components relevant to the relevant component based on the data stored in the component network database; and calculate the importance of the relevant component by integrating the sum total "a" of the influence rates thereof and the number of the components "b."

(9) In achieving the above-mentioned object, the present invention also provides a design support system for presenting components to be affected by design change of a component in an existing product, the design support system including: a component name database which stores the names of components making up the product; a relevant information database which stores data which is generated based on past failure events of the product, the data at least including, in relation to each of the failure events, the name of tier-one component having failed and the name of tier-two component having presumably affected the failure of the tier-one component or been affected thereby, and an influence rate indicative of the scope of damage caused by the failure; component network generation means which, based on the data stored in the component name database and the relevant information database, generates data of a component network covering the names of the components making up the product as well as relevance between these components; a component network database which stores the data generated by the component network generation means; selection means which selects a design-changed component from a CAD diagram displayed on a screen display unit; importance calculation means which acquires the components relevant to the design-changed component selected by the selection means on the basis of the data stored in the component network database so as to calculate the importance of each of the relevant components; and third relevant information display control means which highlights in the CAD diagram the design-changed component selected by the selection means, and displays the relevant components related to the design-changed component in a gradually highlighted manner in accordance with the importance calculated by the importance calculation means.

According to the invention outlined above, there is provided data of a component work based on past failure events of the product, more particularly, on the basis of the relevance between the tier-one components having failed and the tier-two components having presumably affected the failures of the tier-one components or been affected thereby. When a design-changed component is selected in a CAD diagram displayed on the screen display unit, the relevant components related to the design-changed component are obtained based on the component network data, and the importance of each of the relevant components is calculated. In the CAD diagram, the design-changed component is highlighted, and the relevant components related to the design-changed component are displayed in a gradually highlighted manner in accordance with their importance. This structure makes it possible to fully keep tabs on the components that can fail following the design change of a given component. It is also possible to keep tabs on the order in which the relevant components to be considered are prioritized.

(10) Preferably, the design support system described in paragraph (9) above may further include: an event name database which stores the event names of failures that can potentially occur in components of a product; a failure event database which failure event documents each describing, for each of past failure events of the product, the name of the tier-one component having failed, the event name of the failure, the name of the tier-two component having presumably affected the failure of the tier-one component or been affected thereby, an influence rate indicative of the scope of damage caused by the failure, and a countermeasure against the failure; and relevant information extraction means which, from each of the failure event documents stored in said failure event database, extracts the event name of the failure by matching the data stored in the event name database, extracts the names of the tier-one and tier-two components by matching the data stored in the component name database, and further extracts the influence rate and the countermeasure against the failure so as to generate data having, in relation to each of the failure events, the event name of the failure, the name of the tier-one component, the name of the tier-two component, the influence rate, and the countermeasure against the failure. The relevant information database stores the data generated by the relevant information extraction means.

(11) Preferably, the design support system described in paragraph (10) above may further include fourth relevant information display control means which, if either the name of the design-changed component or the name of one of the relevant components displayed in the CAD diagram is selected, searches the data stored in the relevant information database for the failure events including the selected component name as the name of a tier-one component, and displays in the CAD diagram the event name of the failure in the searched failure events and the countermeasure against the failure.

(12) Preferably, in the design support system described in any one of paragraphs (9) through (11) above, for each of the relevant components, the importance calculation means may search the data stored in the relevant information database for the failure events including the name of the relevant component as either the name of the tier-one component or the name of the tier-two component so as to calculate a sum total "a" of the influence rates of the searched failure events; calculate a total number "b" of the components relevant to the relevant component based on the data stored in the component network database; and calculate the importance of the relevant component by integrating the sum total "a" of the influence rates thereof and the number of the components "b".

Effects of the Invention

According to the present invention, it is possible to fully keep tabs on the components that can fail following the design change of a given component.

BRIEF DESCRIPTION OF THE DRAWINGS

FIG. 4 is an illustration showing typical data stored in an event name database of the first embodiment of the present invention.

FIG. 5 is an illustration showing typical data stored in a component name database of the first embodiment of the present invention.

FIG. 6 is an illustration showing typical data stored in a relevant information database of the first embodiment of the present invention.

FIG. 8 is an illustration showing typical data stored in a component network database of the first embodiment of the present invention.

MODE FOR CARRYING OUT THE INVENTION

The first embodiment of the present invention is explained below in reference to the accompanying drawings.

Figure 1:
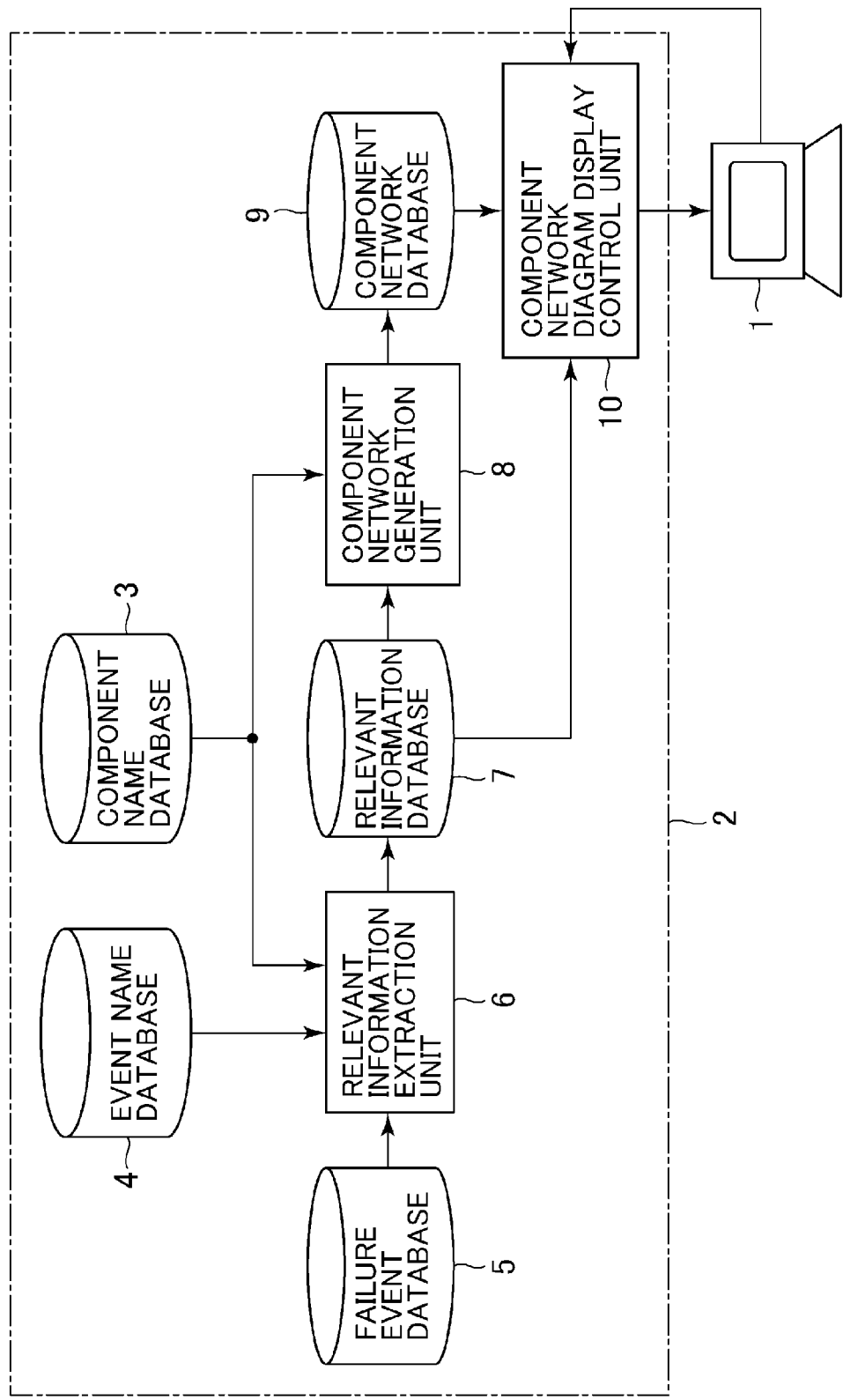
FIG. 1 is a schematic view showing an overall configuration of a design support system as a first embodiment of the present invention.

FIG. 1 is a schematic view showing an overall configuration of a design support system as the first embodiment.

In FIG. 1, the design support system includes a computer (input/output device) 1 for design work and a design support device 2 connected to the computer 1.

The computer 1 includes an input unit (specifically, a keyboard and a mouse) that permits the designer to input data, and a screen display unit (specifically, a display) that displays results of processing. As such, the computer 1 allows design documents such as design materials and specifications of a product to be prepared using document preparation tools for example, and enables part or all of three-dimensional geometry data of the product to be prepared using three-dimensional CAD. Also, the computer 1 stores such data as the design documents and three-dimensional geometry data into a database (not shown) and allows data to be retrieved from the database for display on the screen display unit.

The design support device 2 includes a component name database 3 that stores the names of the components making up the product; an event name database 4 that stores the event names of the failures that can possibly occur in the components of the product; a failure event database 5 that stores failure event documents (see FIG. 2, to be discussed later) each prepared for each of the failure events having occurred in the product in the past; a relevant information extraction unit 6 that extracts information (to be discussed later in detail) from each of the failure event documents stored in the failure event database 5, and generates data having the extracted information relevant to each of the failure events; a relevant information database 7 that stores the data generated by the relevant information extraction unit 6; a component network generation unit 8 that generates data of a component network based on the data stored in the component name database 3 and relevant information database 7; a component network database 9 that stores the data generated by the component network generation unit 8; and a component network diagram display control unit 10 that causes the screen display unit of the computer 1 to display a component network diagram under instructions from the computer 1, and controls the display of the component network diagram.

Figure 2:
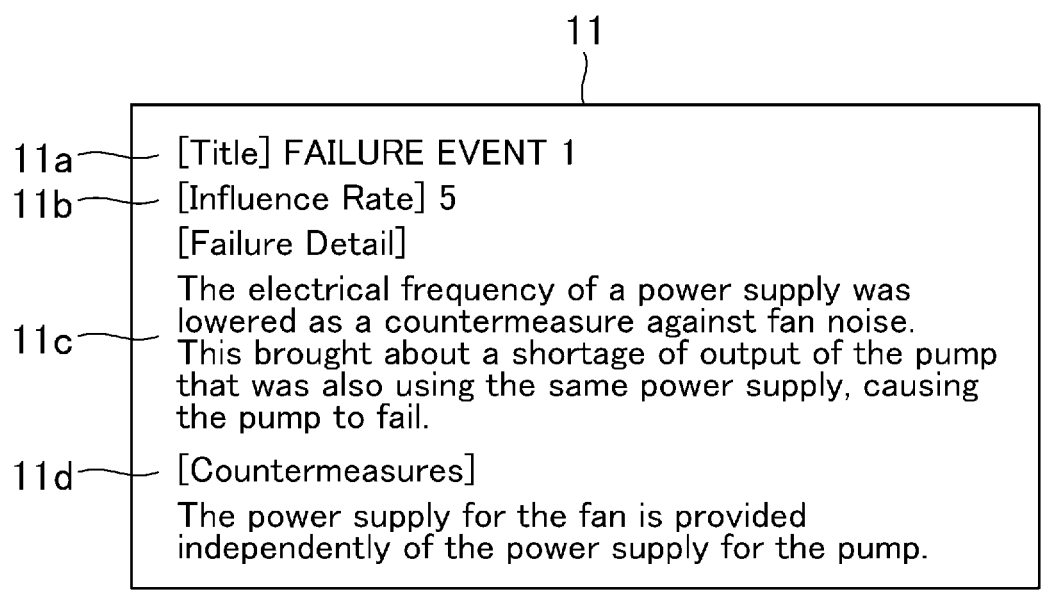
FIG. 2 is an illustration showing a typical failure event document stored in a failure event database of a design support device in the first embodiment of the present invention.

The failure event database 5 stores failure event documents 11 each in relation to each of the failure events having occurred in the product in the past, each document describing a title of a failure event, details of the failure, a influence rate of the failure, and a countermeasure against the failure. Specifically, as shown in FIG. 2 for example, the failure event document 11 contains a title field 11a, an influence rate field 11b, a failure detail field 11c, and a countermeasure field 11d. And the title is described in the title field 11a, and the influence rate (specifically, one of level 1 through level 5 is given; level 5 denotes the largest scale of damage) is written in the influence rate field 11b. Described in the failure detail field 11c are the details of the failure (specifically, text is written including the name of a tier-one component that failed, the event name of the failure, and the name of a tier-two component that have presumably affected the failure of the tier-one component or been affected thereby), and the countermeasure against the failure are described in the countermeasure field 11d.

Figure 3:
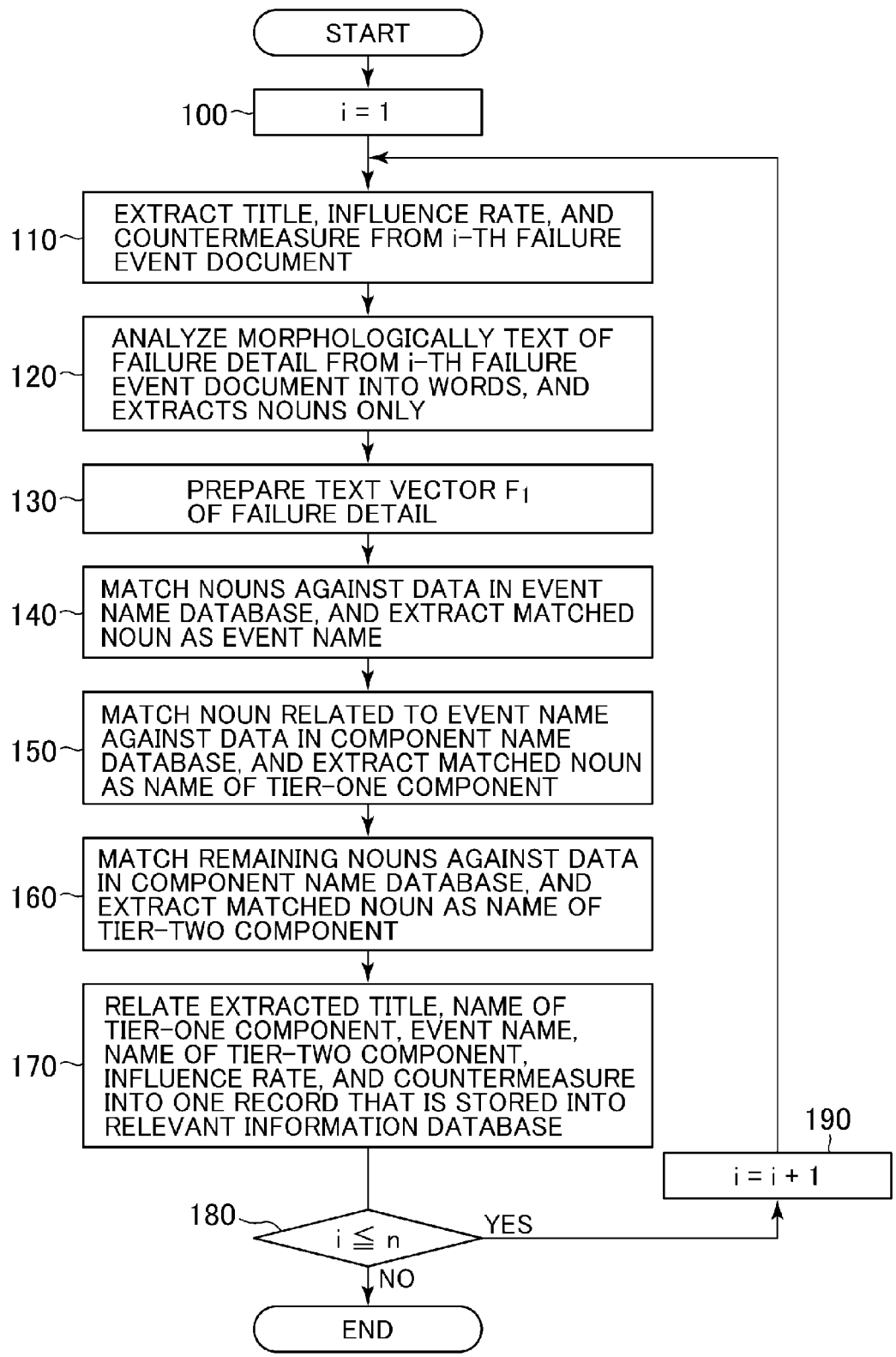
FIG. 3 is a flowchart showing a detailed process performed by a relevant information extraction unit of the first embodiment of the present invention.

Next, the procedure performed by the relevant information extraction unit 6 (relevant information extraction means) is explained in reference to FIG. 3. FIG. 3 is a flowchart showing the detailed process carried out by the relevant information extraction unit 6.

First, in step 100 of FIG. 3, an arithmetic operator "i" is initialized to 1 (i=1). In step 110, given that i=1, the title, influence rate, and countermeasure are extracted from the title field 11a, influence rate field 11b, and countermeasure field 11d, respectively, of a first failure event document 11 stored in the failure event database 5. Specifically, in the failure event document 11 shown in FIG. 2 for example, the title "failure event 1" is extracted from the title field 11a, the influence rate "5" from the influence rate field 11b, and the countermeasure described as "the power supply for the fan is provided independently of the power supply for the pump" from the countermeasure field 11.

Then in step 120, the text in the failure detail field 11c of the first failure event document 11 is morphologically analyzed into words. Morphological analysis is a process that involves breaking down the text written in natural language into words and determining their parts of speech. Thereafter, only nouns are extracted from the words thus broken down. Specifically, from the failure detail field 11c of the failure event document 11 shown in FIG. 2 for example, the words "fan", "noise", "countermeasure", "power supply", "electrical frequency", "pump", "shortage of output", "fail", and "occurrence" are extracted as nouns. And in step 130, a text vector $F_1$ is prepared of which the dimension is represented by all extracted nouns and of which the components are each defined as the number of times each noun has appeared. This text vector is for use in the process of calculating relevance ratios, to be discussed later (see FIG. 10).

And in step 140, all nouns extracted from the failure detail field 11c of the first failure event document 11 are matched successively against the data stored in the event name database 4 to see if there is a match. In the event of a match, the matched noun is extracted as the event name of the failure. Specifically, the event name database 4 stores event names such as "shortage of output", "strength poverty", "cracks", and "temperature rise" as shown in FIG. 4 for example. An ID and a synonym are stored in relation to each of the event names. The ID uniquely identifies each event name; there are no overlaps. For example, the event name "shortage of output" is stored in relation to a synonym "drop in output". If all nouns extracted from the failure detail field 11c of the failure event document 11 shown in FIG. 2 are matched successively against the event names and their synonyms stored in the event name database 4, the event name "shortage of output" is found matched in the event name database 4, so that the matched name is extracted as the event name of the failure. If the synonym "drop in output" is matched in the event name database 4, then the event name "shortage of output" corresponding to the synonym is extracted in place of the synonym.

Then in step 150, of the all nouns extracted from the failure detail field 11c of the first failure event document 11, the noun related to the noun extracted as the event name of the failure is matched successively against the data stored in the component name database 3 to see if there is a match. In the event of a match, the matched name is extracted as that of a tier-one component that failed. Specifically, the component name database 3 stores component names such as "fan", "power supply", "pump", and "electrical heater" as shown in FIG. 5 for example. Also, each component name is stored in relation to the corresponding ID and synonym. The ID uniquely identifies each component name, and there are no overlaps. Typically, a synonym "ventilator" is stored in relation to the component name "fan". For example, of the all nouns extracted from the failure detail field 11c of the failure event document 11 shown in FIG. 2, the noun "pump" related to the noun "shortage of output" extracted as the event name of the failure is matched successively against the component names and their synonyms in the component name database 3. This leads to a match with the component name "pump" stored in the component name database 3. The matched component name is then extracted as the name of a tier-one component.

Later in step 160, the remaining nouns extracted from the failure detail field 11c of the first failure event document 11 are matched successively against the data stored in the component name database 3 to see if there is a match. In the event of a match, the matched component name is extracted as the name of a tier-two component that has affected the failure of the tier-one component or been affected thereby. Specifically, if the remaining nouns (to be precise, "fan", "noise", "countermeasure", "power supply", "electrical frequency", "shortage of output", "failure", and "occurrence" mentioned above) extracted from the failure detail field 11c of the first failure event document 11 are matched successively against the component names and their synonyms stored in the component name database 3, the component names "fan" and "power supply" are found matched in the component name database 3. These matched names are extracted as the names of tier-two components. If the synonym "ventilator" is matched in the component name database 3, then the component name "fan" corresponding to the synonym is extracted in place of the synonym.

And in step 170, the title, the name of the tier-one component, the event name of the failure, the name of the tier-two component, the influence rate, the countermeasure against the failure, and the text vector $F_1$ extracted from the first failure event document 11 are related into a single record that is then stored into the relevant information database 7. Specifically, upon their extraction from the failure event document 11 shown in FIG. 2, the title "failure event 1", the tier-one component name "pump", the event name "drop in output", the tier-two component names "fan" and "power supply", the influence rate "5", the countermeasure described as "the power supply for the fan is provided independently of the power supply for the pump", and the text vector $F_1$ are related into a single record that is stored into the relevant information database 7 (see FIG. 6). In FIG. 6, one record is represented by one row.

Then in step 180, it is determined whether or not the arithmetic operator "i" is equal to or smaller than the total number "n" of the failure event documents stored in the failure event database 5 (i≤n). For example, if it is assumed that the total number "n" of the failure event documents is equal to or larger than 10 (n≥10), then the result of the determination in step 180 is negative because the arithmetic operator "i" is 1 (i=1). In this case, step 190 is reached. In step 190, the arithmetic operator "i" is incremented by 1 (i=i+1) so that i=2.

And back in step 110, given that i=2, the title, influence rate, and countermeasure are extracted from the title field 11a, influence rate field 11b, and countermeasure field 11d, respectively, of the second failure event document 11 stored in the failure event database 5. In step 120, the text in the failure detail field 11c of the second failure event document 11 are morphologically analyzed into words, and only nouns are extracted from the words thus broken down. And in step 130, a text vector $F_2$ is prepared of which the dimension is represented by all extracted nouns and of which the components are each defined as the number of times each noun has appeared. Then in step 140, all nouns are matched successively against the data stored in the event name database 4 to see if there is a match. In the event of a match, the matched noun is extracted as the event name of the failure. In step 150, the noun related to the noun extracted as the event name of the failure is matched successively against the data stored in the component name database 3 to see if there is a match. In the event of a match, the matched name is extracted as that of a tier-one component. Later in step 160, the remaining nouns are matched successively against the data stored in the component name database 3 to see if there is a match. In the event of a match, the matched component name is extracted as the name of a tier-two component. In step 170, the title, the name of the tier-one component, the event name of the failure, the name of the tier-two component, the influence rate, the countermeasure against the failure, and the text vector $F_2$ extracted from the second failure event document 11 are related into a single record that is then stored into the relevant information database 7. As a specific example, the title "failure event 2", the tier-one component name "electrical heater", the event name "abnormal heating", the tier-two component name "power supply", the influence rate "3", the countermeasure described as "the connecting method is verified", and the text vector $F_2$ are related into a single record that is stored into the relevant information database 7 (see FIG. 6).

Then in step 180, it is determined whether or not the arithmetic operator "i" is equal to or smaller than the total number "n" of the failure event documents (i≤n). For example, if it is assumed that the total number "n" of the failure event documents is equal to or larger than 10 (n≥10), then the result of the determination in step 180 is negative because the arithmetic operator "i" is 2 (i=2). In this case, step 190 is reached. In step 190, the arithmetic operator "i" is incremented by 1 (i=i+1) so that i=3.

And the above-mentioned procedure of steps 110 through 170 is repeated until the arithmetic operator "i" becomes equal to the number "n" (i=n). Then once the arithmetic operator "i" reaches "n" (i=n; i.e., after the information is extracted from all failure event documents 11 stored in the failure event database 5 and the data having the extracted information related to each failure event is generated and stored into the relevant information database 7), the result of the determination in step 180 becomes affirmative and the process is terminated. When another failure event document 11 is added to the failure event database 5, the procedure above of steps 110 through 170 is also repeated.

Figure 7:
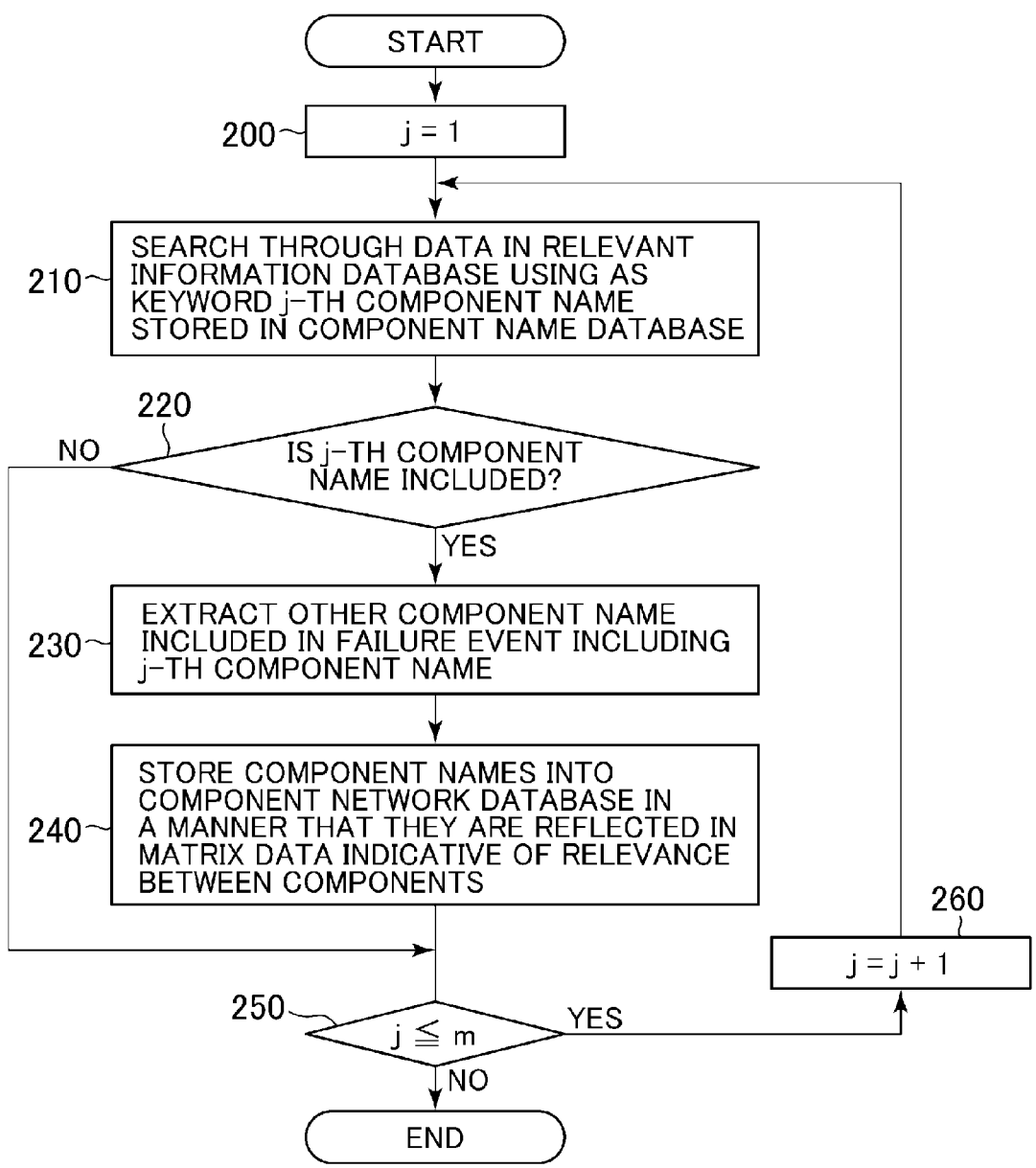
FIG. 7 is a flowchart showing a detailed process performed by a component network generation unit of the first embodiment of the present invention.

Explained next in reference to FIG. 7 is the procedure performed by the component network generation unit (component network generation means). FIG. 7 is a flowchart showing the detailed process carried out by the component network generation unit 8.

First in step 200 of FIG. 7, an arithmetic operator "j" is initialized to 1 (j=1). In step 210, given that j=1, a search is made through the data stored in the relevant information database 7 using as the keyword the first component name held in the component name database 3. And in step 220, it is determined whether there exists any record (failure event) including the first component name. If a record containing the first component name is determined to exist for example, the result of the determination in step 220 is affirmative and step 230 is reached. In step 230, the other component name included in the record in question is extracted. Then in step 240, the component names are stored into the component network database 9 in a manner that they are reflected in the component network data. The component network data refers to a matrix of data indicative of the relevance between components as shown in FIG. 8. In the matrix, the names of the components constituting the product of interest are described in rows and columns. Where a given component is relevant to any other component, "1" is input to the cell where the row describing the name of the component of interest intersects with the column depicting the name of the other component, and "1" is also input to the cell where the row describing the name of the other component intersects with the column depicting the name of the component of interest. Each cell where the row and the column containing the names of irrelevant components intersect with each other is left blank.

Specifically, if a search is made using as the keyword the first component name "fan" in the data stored in the component database 3 shown in FIG. 5 for example, one record is found from the data of the relevant information database indicated in FIG. 6. This record includes component names "power supply" and "pump" in addition to the component name "fan". Thus as shown in FIG. 8, "1" is input to each of the cells where the row describing the component name "fan" intersects with the columns depicting the component names "power supply" and "pump"; "1" is input to each of the cells where the row describing the component name "power supply" intersects with the columns depicting the component names "fan" and "pump", and "1" is input to each of the cells where the row describing the component name "pump" intersects with the columns depicting the component names "fan" and "power supply".

Then in step 250, it is determined whether or not the arithmetic operator "j" is equal to or smaller than the total number "m" of the component names stored in the component name database 3 (j≤m). For example, if it is assumed that the total number "m" of the component names is equal to or larger than 10 (m≤10), then the result of the determination in step 250 is negative because the arithmetic operator "j" is 1 (j=1). In this case, step 260 is reached. In step 260, the arithmetic operator "j" is incremented by 1 (j=j+1) so that j=2.

And back in step 210, given that j=2, a search is made through the data stored in the relevant information database 7 using as the keyword the second component name held in the component name database 3. In step 220, it is determined whether there exists any record that includes the second component name. If a record containing the second component name is determined to exist for example, the result of the determination in step 220 is affirmative and step 230 is reached. In step 230, the other component name included in the record in question is extracted. Then in step 240, the component names are stored into the component network database 9 in a manner that they are reflected in the component network data.

Specifically, if a search is made using as the keyword the second component name "power supply" in the data of the component database 3 shown in FIG. 5 for example, two records are found from the data of the relevant information database indicated in FIG. 6. Although one of the two records includes component names "fan" and "pump" in addition to the component name "power supply", the relevance of this record has already been reflected in the component network data. The other record includes a component name "electrical heater" in addition to the component name "power supply". Thus as shown in FIG. 8, "1" is input to each cell where the row describing the component name "power supply" intersects with the column depicting the component name "electrical heater", and "1" is input to each cell where the row describing the component name "electrical heater" intersects with the column depicting the component name "power supply".

Then in step 250, it is determined whether or not the arithmetic operator "j" is equal to or smaller than the total number "m" of the component names stored in the component name database 3 (j≤m). For example, if it is assumed that the total number "m" of the component names is equal to or larger than 10 (m≤10), then the result of the determination in step 250 is negative because the arithmetic operator "j" is 2 (j=2). In this case, step 260 is reached. In step 260, the arithmetic operator "j" is incremented by 1 (j=j+1) so that j=3.

And back in step 210, given that j=3, a search is made through the data stored in the relevant information database 7 using as the keyword the third component name held in the component name database 3. In step 220, it is determined whether there exists any record that includes the third component name. If a record containing the third component name is determined to exist for example, the result of the determination in step 220 is affirmative and step 230 is reached. In step 230, the other component name included in the record in question is extracted. Then in step 240, the component names are stored into the component network database 9 in a manner that they are reflected in the component network data.

Specifically, if a search is made using as the keyword the third component name "pump" in the data of the component database 3 shown in FIG. 5 for example, two records are found from the data of the relevant information database indicated in FIG. 6. Although one of the two records includes the component names "fan" and "pump" in addition to the component name "pump", the relevance of this record has already been reflected in the component network data. The other record includes component names "component A," "component B" and "component C" in addition to the component name "pump". Thus as shown in FIG. 8, "1" is input to each cell where the row describing the component name "pump" intersects with the columns depicting the component names "component A", "component B", and "component C"; "1" is input to each cell where the row describing the component name "component A" intersects with the columns depicting the component names "pump", "component B", and "component C"; "1" is input to each cell where the row describing the component name "component B" intersects with the columns depicting the component names "pump", "component A", and "component C"; and "1" is input to each cell where the row describing the component name "component C" intersects with the columns depicting the component names "pump", "component A", and "component B".

Then in step 250, it is determined whether or not the arithmetic operator "j" is equal to or smaller than the total number "m" of the component names stored in the component name database 3 (j≤m). For example, if it is assumed that the total number "m" of the component names is equal to or larger than 10 (m≥10), then the result of the determination in step 250 is negative because the arithmetic operator "j" is 3 (j=3). In this case, step 260 is reached. In step 260, the arithmetic operator "j" is incremented by 1 (j=j+1) so that j=4.

And back in step 210, given that j=4, a search is made through the data stored in the relevant information database 7 using as the keyword the fourth component name held in the component name database 3. In step 220, it is determined whether there exists any record that includes the fourth component name. If a record containing the fourth component name is determined to exist for example, the result of the determination in step 220 is affirmative and step 230 is reached. In step 230, the other component name included in the record in question is extracted. Later in step 240, the component names are stored into the component network database 9 in a manner that they are reflected in the component network data.

Specifically, if a search is made using as the keyword the fourth component name "electrical heater" in the data of the component database 3 shown in FIG. 5 for example, two records are found from the data of the relevant information database indicated in FIG. 6. Although one of the two records includes the component name "power supply" in addition to the component name "electrical heater", the relevance of this record has already been reflected in the component network data. The other record includes a component name "component D" in addition to the component name "electrical heater". Thus as shown in FIG. 8, "1" is input to each cell where the row describing the component name "electrical heater" intersects with the column depicting the component name "component D," and "1" is also input to each cell where the row describing the component name "component D" intersects with the column depicting the component name "electrical heater".

Then in step 250, it is determined whether or not the arithmetic operator "j" is equal to or smaller than the total number "m" of the component names stored in the component name database 3 (j≤m). For example, if it is assumed that the total number "m" of the component names is equal to or larger than 10 (m≥10), then the result of the determination in step 250 is negative because the arithmetic operator "j" is 4 (j=4). In this case, step 260 is reached. In step 260, the arithmetic operator "j" is incremented by 1 (j=j+1) so that j=5.

And the above-mentioned procedure of steps 210 through 250 is repeated until the arithmetic operator "j" becomes equal to the number "m" (j=m). Then once the arithmetic operator "j" reaches "m" (j=m; i.e., after searches have been made using as the keywords all component names stored in the component name database 3 and the results of the searches have been stored into the component network database 9 in a manner that they are reflected in the component network data), the result of the determination in step 260 becomes affirmative and the process is terminated. When another record is added to the relevant information database 7 (i.e., when another failure event document 11 is added to the failure event database 5), the procedure above of steps 200 through 260 is also repeated.

Figure 9:
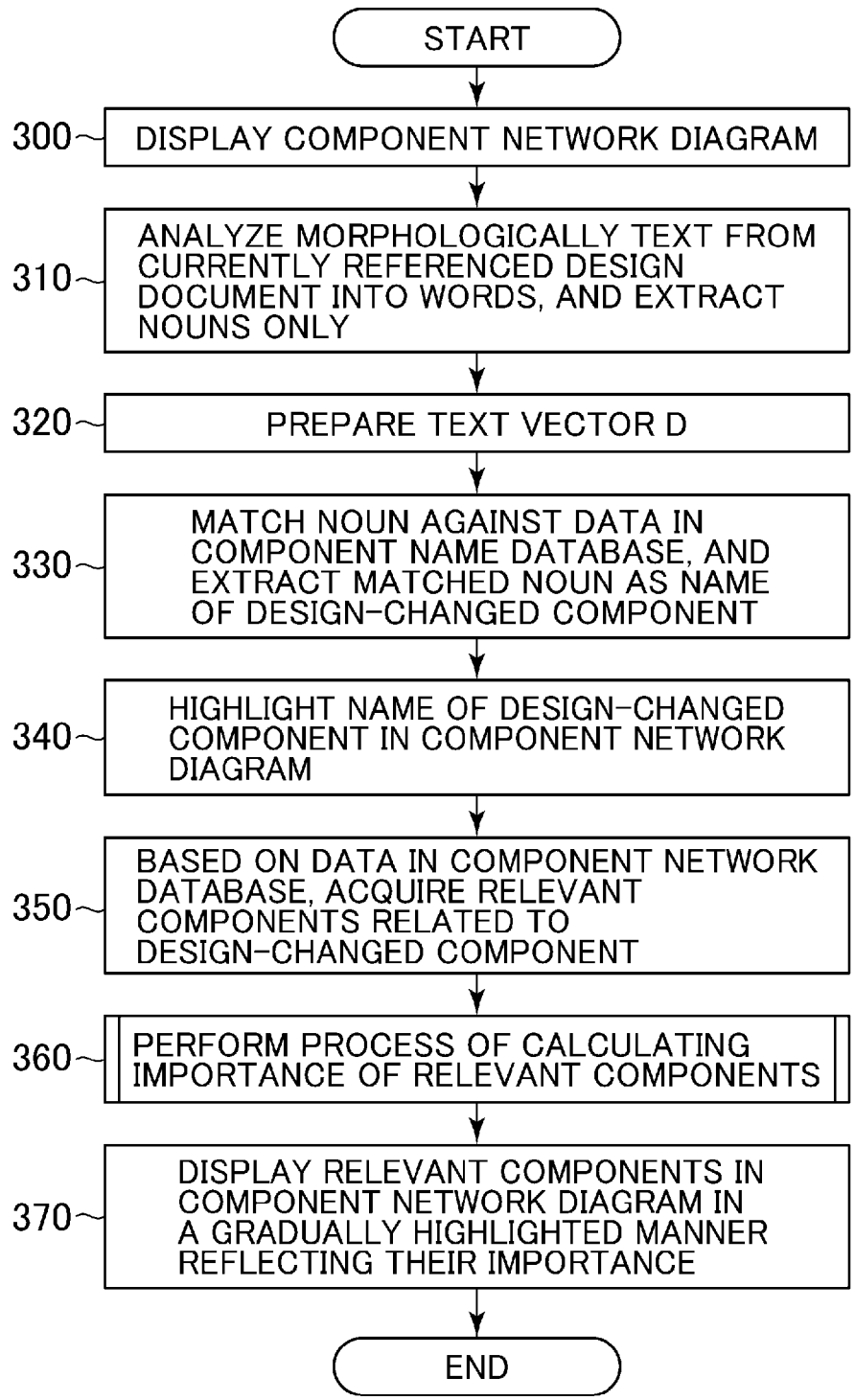
FIG. 9 is a flowchart showing a detailed control process performed by a component network diagram display control unit of the first embodiment of the present invention.
Figure 10:
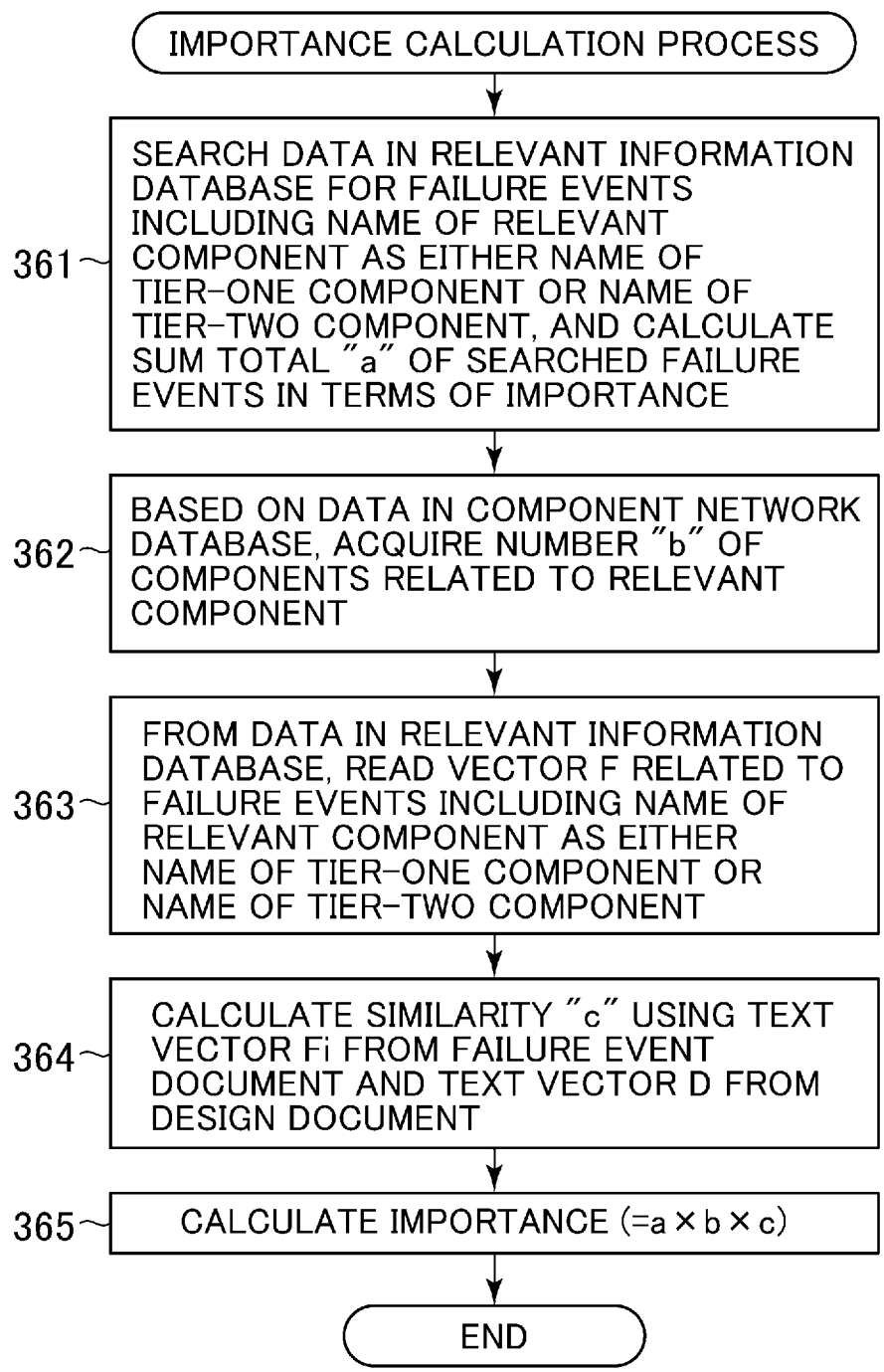
FIG. 10 is a flowchart showing a detailed importance calculation process for calculating the importance of relevant components in FIG. 9.

Next, the procedure performed by the component network diagram display control unit 10 is explained in reference to FIGS. 9 and 10. FIG. 9 is a flowchart showing the control process performed by the component network diagram display control unit 10. FIG. 10 is a flowchart showing the importance calculation process (step 360) for calculating the importance of relevant components.

Figures 11, 12:
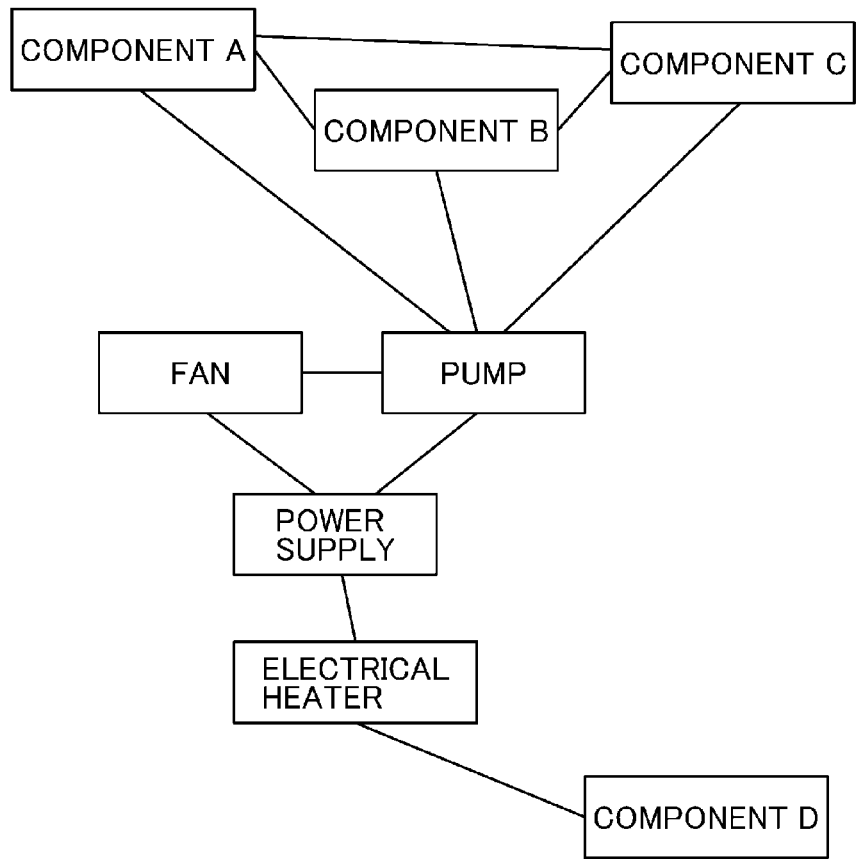
FIG. 11 is an illustration showing a typical component network diagram for the first embodiment of the present invention, the diagram showing the state in which component names are not highlighted.
FIG. 12 is an illustration showing a typical design document for the first embodiment of the present invention.

In step 300 of FIGS. 9 and 10, the data stored in the component network database 9 is read under instructions from the computer 1, and a component network diagram based on the retrieved data is displayed on the screen display unit of the computer 1 (by the component network diagram display control means). A typical component network diagram is shown in FIG. 11. In FIG. 11, based on the data of the component network database 9 shown in FIG. 9, the names of the components "fan", "power supply", "pump", "electrical heater", "component A", "component B", "component C", and "component D" making up the product are displayed together with lines indicative of the relevance between these components.

With this embodiment, it is assumed that a design document currently referenced (or prepared) by the designer (i.e., a design document displayed on the screen display unit of the computer 1) includes the name of a design-changed component. The name of the design-changed component is to be extracted selectively from the description of the design document in question. Thus first in step 310, the text in the design document currently referenced by the designer is morphologically analyzed into words, and only nouns are extracted from the words broken down in this manner. Then in step 320, a text vector D is prepared of which the dimension is represented by all extracted nouns and of which the components are each defined as the number of times each noun has appeared. This text vector is for use in the process of calculating relevance ratios, to be discussed later.

Figure 13:
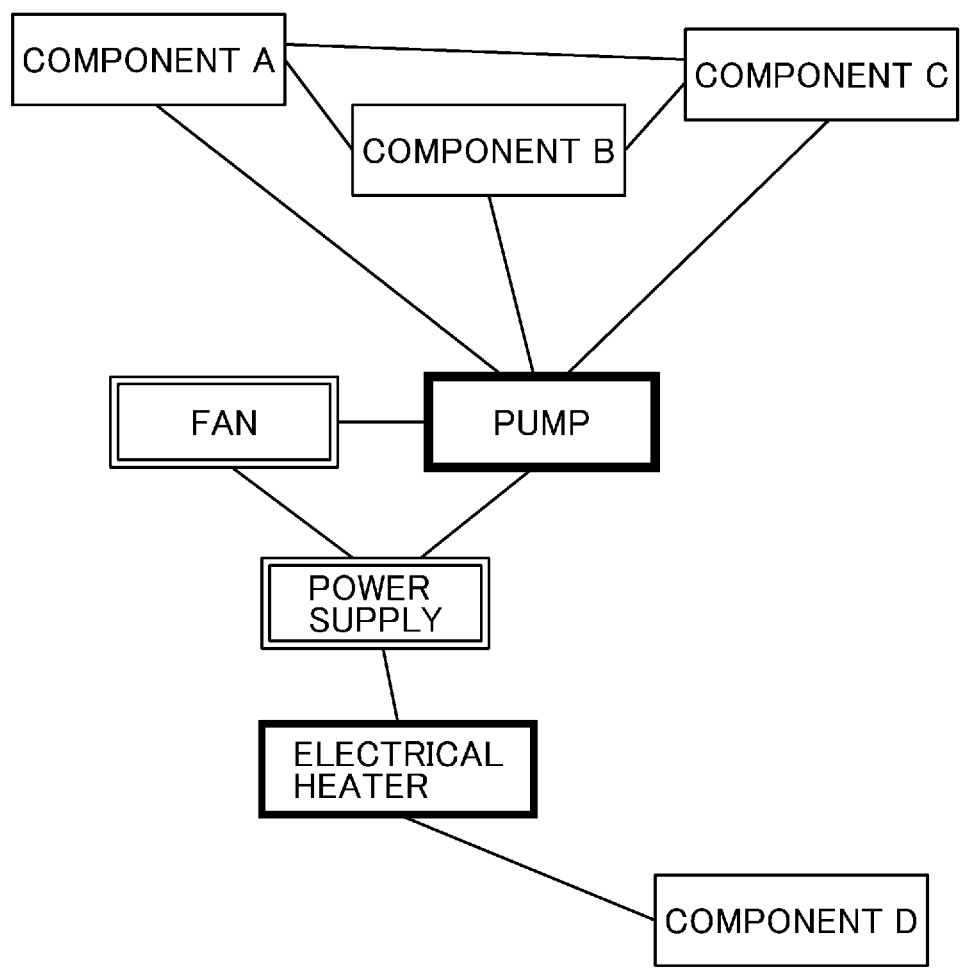
FIG. 13 is an illustration showing a typical component network diagram for the first embodiment of the present invention, the diagram showing the state in which component names are highlighted.

And in step 330, all nouns extracted from the design document are matched successively against the data stored in the component name database 3 to see if there is a match. In the event of a match, the matched noun is extracted as the name of the design-changed component (by the selection means). Specifically, all nouns extracted from the design document 12 shown in FIG. 12 are matched successively against the component names and their synonyms stored in the component name database 3 for example. This leads to a match with the component names "fan" and "power supply" held in the component name database 3, and the matched names are extracted as the names of design-changed components. Then in step 340, the name of the design-changed component in the component network diagram is highlighted (by the second relevant information display control means). More specifically, as shown in FIG. 13 for example, the outer frames enclosing the names "fan" and "power supply" of the design-changed components displayed in the component network diagram are each highlighted by a double line. Alternatively, the outer frames may be highlighted by changing their color or shape, for example.

And in step 350, based on the data stored in the component network database 9, the relevant components related to the design-changed components are acquired. In step 360, the importance of each of the relevant components is calculated (by the importance calculation means). Specifically, if "fan" and "power supply" are extracted as the design-changed components as described above, relevant components "pump" and "electrical heater" related respectively to these design-changed components are acquired, and the importance of each of the extracted relevant components is calculated.

First, in step 361 in the importance calculation process of step 360, a search is made through the data stored in the relevant information database 7 for failure events including the name of the relevant component as either the name of tier-one component or the name of tier-two component. The sum total "a" of the influence rates of the searched failure events is then calculated. And in step 362, based on the data stored in the component network database 9, the total number "b" of the components related to the relevant component is calculated. Then in step 363, from the data held in the relevant information database 7, a text vector F is read which is related to the failure event including the name of the relevant component as either the name of tier-one component or the name of tier-two component. Later in step 364, a similarity "c" between the failure event document 11 and the design document 12 is calculated using the text vector F read in step 363 earlier (specifically, the text vector of the failure detail field 11c in the failure event document 11) and the text vector of the design document 11 prepared in step 320 earlier (see the mathematical expression 1 below). If there exist a plurality of failure event documents 11 including the name of the relevant component, the similarity "c" is calculated between each of these failure event documents and the design document 12, and an average "c'" of these similarities is calculated.

$$c = \frac{D \cdot F}{|D| \cdot |F|} \quad \text{[Math. 1]}$$

And in step 365, the importance of the relevant component is calculated by integrating the sum total "a" of the influence rates calculated in step 361 earlier, the number "b" of the components calculated in step 362 earlier, and the similarity "c" (or average "c'" of the similarities) calculated in step 364 earlier.

Explained below as a specific example is the case in which the importance of the relevant component "pump" is calculated. First, a search is made through the data of the relevant information database shown in FIG. 6 using the name of the relevant component "pump" as the keyword. This leads to a match with two records. Calculating the sum total "a" of the influence rates of these failure events provides a=5+3=8. In the component network data shown in FIG. 8, the components relevant to the "pump" are "fan", "power supply", "component A", "component B", and "component C" so that the total number "b" of the components is 5 (b=5). If the average "c'" of the similarities involved is calculated to be 20 (c'=20) for example, the importance is given as a×b×c=8×5×20=800.

Explained next as another specific example is the case in which the importance of the relevant component "electrical heater" is calculated. First, a search is made through the data of the relevant information database shown in FIG. 6 using the name of the relevant component "electrical heater" as the keyword. This leads to a match with two records. Calculating the sum total "a" of the influence rates of these failure events provides a=3+1=4. In the component network data shown in FIG. 8, the components relevant to the "electrical heater" are "power supply" and "component D" so that the total number "b" of the components is 2 (b=2). If the average "c'" of the similarities involved is calculated to be 5 (c'=5) for example, the importance is given as a×b×c=4×2×5=40.

Incidentally, the importance may be calculated by weighting each of the values "a," "b" and "c" (or c') mentioned above. The importance may also be calculated by replacing the total number "b" of the components related to the relevant component with a number "b'" of components obtained by subtracting the number of the design-changed components from the total number "b".

Upon completion of the importance calculation process in step 360 explained above, step 370 is reached. In step 370, the names of the relevant components in the component network diagram are highlighted (by second relevant information display control means) in a graduated manner reflecting the importance calculated in step 360 earlier. Specifically, as shown in FIG. 13, the outer frames enclosing the relevant component names "pump" and "electrical heater" displayed in the component network diagram are highlighted using five line thicknesses in accordance with the importance. In FIG. 13, the importance of "pump" is greater than that of "electrical heater" so that the outer frame of "pump" is shown thicker than the outer frame of "electrical heater." Alternatively, the outer frames enclosing the names of the relevant components may be highlighted using five-graduated colors. As another alternative, the outer frames may be highlighted using five-graduated shapes. As a further alternative, the importance of each relevant component (in numerical value) may be displayed near the name of the component.

Figure 14:
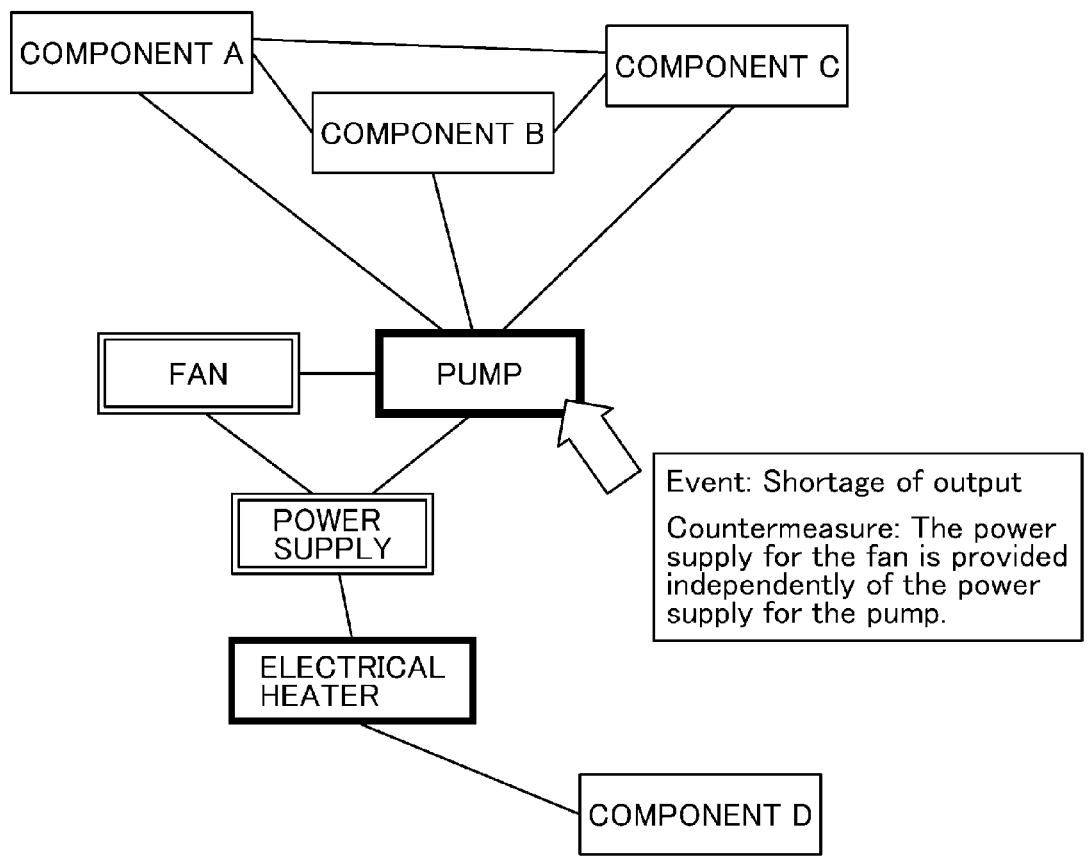
FIG. 14 is an illustration showing a typical component network diagram for the first embodiment of the present invention, the diagram showing the state in which an event name and a countermeasure are displayed.

In addition to the above-described display function, the component network diagram display control unit 10 possesses other display capabilities. For example, when the designer operates the input unit of the computer 1 to move the cursor onto the name of a component in the component network diagram displayed on the screen display unit of the computer 1, the component network diagram display control unit 10 searches the data stored in the relevant information database 7 for a failure event including the name of the component of interest as the name of a tier-one component, and reads the event name of the failure and the countermeasure against the failure from the searched failure event. And as shown in FIG. 14, the event name and countermeasure thus read are displayed in the component network diagram (by first relevant information display control means).

With this embodiment configured as explained above, the design support device 2 generates the component network data based on the past failure events of the product of interest, or more specifically, on the basis of the relevance between the tier-one components that have failed on the one hand and the tier-two components that have affected the failures of the tier-one components or been affected thereby on the other hand. The component network diagram derived from the data thus generated is displayed on the screen display unit of the computer 1. This allows the designers to fully keep tabs on the components that can possibly fail following the design change of a given component without relying on their skills or experience.

Also with this embodiment, when the cursor is moved onto the name of a given component in the component network diagram, the design support device 2 displays the event name of the failure that has occurred on the component in question and the countermeasure taken against the failure. This allows the designers to keep tabs on the failures that occurred on components in the past and the countermeasures taken against the failures.

Also with this embodiment, the design support device 2 highlights the name of a design-changed component in the component network diagram and displays the names of the relevant components related to the design-changed component in a gradually highlighted manner reflecting the importance of the relevant components. This allows the designers to keep tabs on the order in which the relevant components to be considered are prioritized without relying on their skills or experience.

With the first embodiment above, it was explained for example that the component network diagram display control unit 10 matches the name of the component described in the design document currently displayed on the screen display unit of the computer 1 against the data stored in the component name database 3 for extraction, and selects the extracted component as a design-changed component. However, this is not limitative of this invention. Alternatively, if the input unit of the computer 1 is operated to move the cursor onto the name of a given component in the component network diagram and make some kind of input for example, the component network diagram display control unit 10 may select the component in question as the design-changed component. In this case, the importance of relevant components is calculated on the assumption that a relevance ratio "c" (or average c' of relevance ratios) is 1 (c or c'=1). That is, the importance of the relevant components is calculated by integrating the sum total "a" of the influence rates involved and the number "b" of the components. This variation also provides advantages effects similar to the above-described effects.

Also with the first embodiment above, it was explained for example that the component network diagram display control unit 10 has the function of highlighting the name of a design-changed component in the component network diagram and of calculating the importance of the relevant components related to the design-changed component of interest so as to display the relevant components in the component network diagram in a gradually highlighted manner reflecting the importance of the relevant components. Alternatively, that function may not be provided. In this case, there is no need for the relevant information extraction unit 6 to extract the influence rates from the failure event documents 11 or to prepare the text vector F. That is, the data stored in the relevant information database 7 need not include the influence rates or the text vector F. With this variation, as with the above-described first embodiment, it is possible to fully keep tabs on the components that can fail following the design change of a given component.

Also with the first embodiment discussed above, it was explained for example that the component network diagram display control unit 10 has the function of displaying the event name of a failure and the countermeasure against the failure in the component network diagram. Alternatively, that function may not be provided. In this case, there is no need for the relevant information extraction unit 6 to extract countermeasures from the failure event documents 11 or for the data in the relevant information database 7 to include event names and countermeasures. With this variation, as with the first embodiment above, it is also possible to fully keep tabs on the components that can fail following the design change of a given component.

Figure 15:
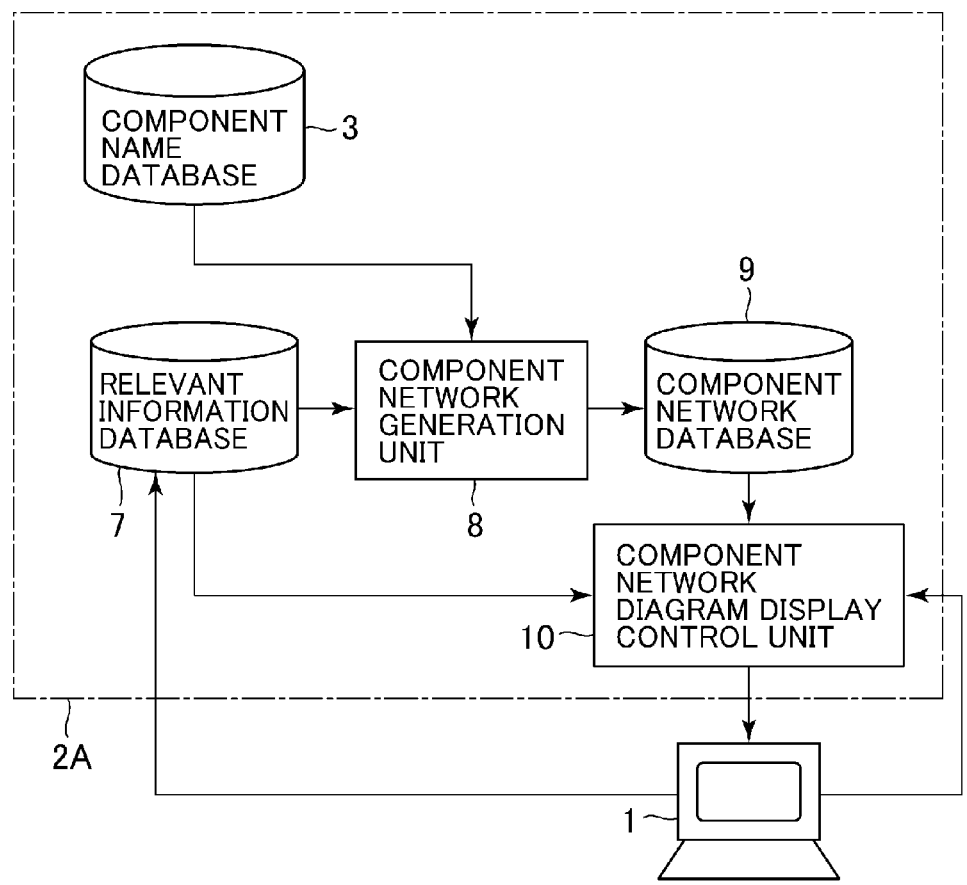
FIG. 15 is a schematic view showing an overall configuration of a design support system as one variation of the present invention.

Also with the first embodiment above, it was explained for example that the design support device 2 is configured to include the event name database 4, failure event database 5, and relevant information extraction unit 6. Alternatively, as with a variation shown in FIG. 15, a design support device 2A may be provided in a manner excluding the event name database 4, failure event database 5, and relevant information extraction unit 6. In this case, the computer 1 or the like may generate the data which is based on the past failure events of the product in question, and which at least includes, in relation to each of the failure events, the name of the tier-one component having failed and the name of the tier-two component having presumably affected the failure of the tier-one component or been affected thereby, and the data thus generated may be stored into the relevant information database 7. With this variation, as with the first embodiment above, it is also possible to fully keep tabs on the components that can fail following the design change of a given component.

Also with the first embodiment above, it was explained for example that the component network diagram display control unit 10 causes the screen display unit of the computer 1 to display the component network diagram. Alternatively, another screen display unit (specifically, a display) apart from the screen display unit of the computer 1 may be attached to the design support device 2, and the component network diagram may be displayed on the attached screen display unit of the design support device 2. This variation also provides advantageous effects similar to the effects discussed above.

The second embodiment of the present invention is explained below in reference to FIGS. 16 and 17. This embodiment involves selectively highlighting a design-changed component in a CAD diagram displayed on the screen display unit of the computer and displaying the relevant components related to the design-changed component in a gradually highlighted manner reflecting the importance of the relevant components.

Figure 16:
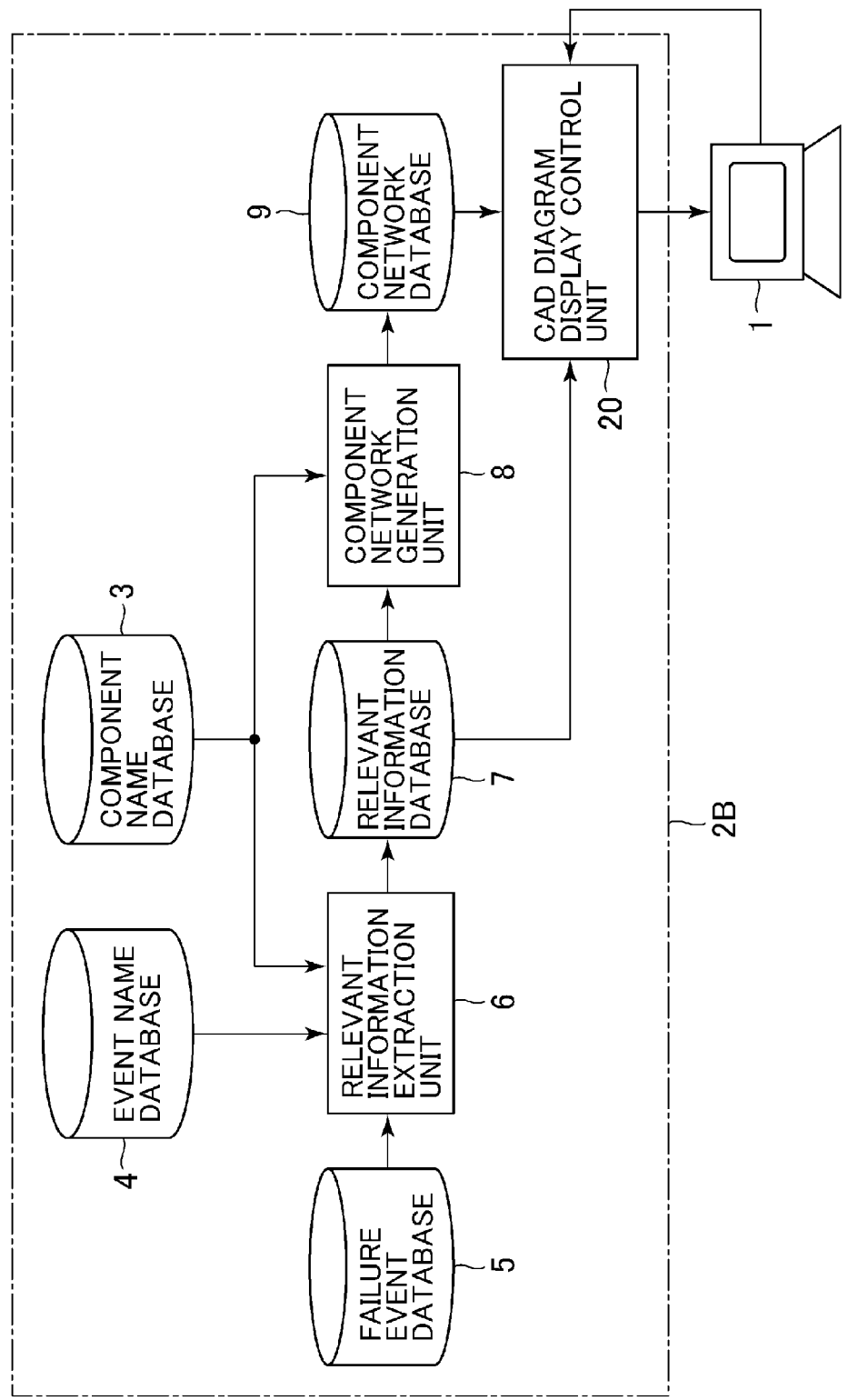
FIG. 16 is a schematic view showing an overall configuration of a design support system as a second embodiment of the present invention.
Figure 17:
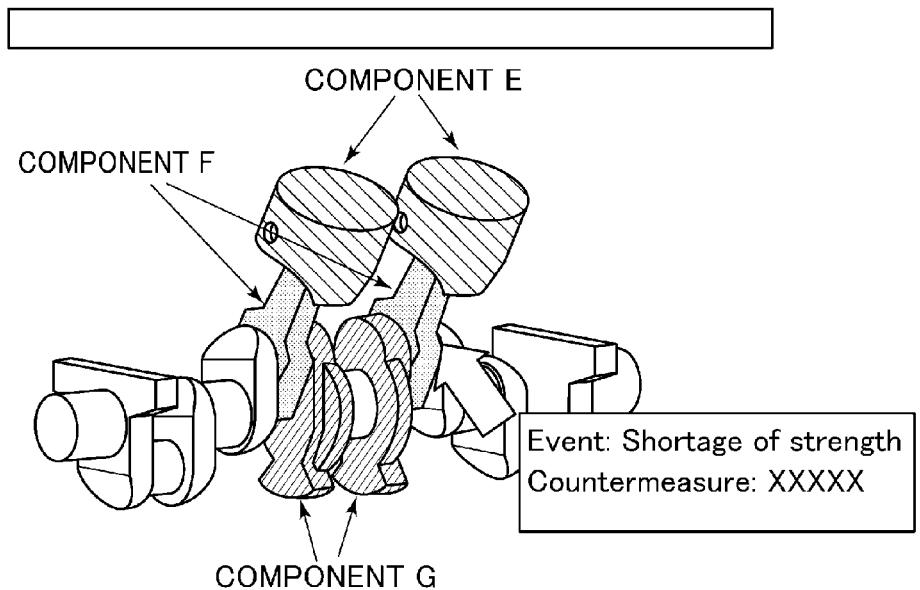
FIG. 17 is an illustration showing a typical CAD diagram for the second embodiment of the present invention, the diagram showing the state in which an event name and a countermeasure are displayed.

FIG. 16 is a schematic view showing an overall configuration of a design support system as the second embodiment. In FIG. 16, the parts substantially the same as those of the first embodiment or those of its variations are designated by like reference numerals, and their explanations will be omitted hereunder where redundant.

In this embodiment, a design support system 2B, like the design support device 2 of the above-described first embodiment, includes a component name database 3, an event name database 4, a failure event database 5, a relevant information extraction unit 6, a relevant information database 7, a component network generation unit 8, and a component network database 9. The design support device 2 further includes a CAD diagram display control unit 20 that controls the display of CAD diagrams.

The CAD diagram display control unit 20 may be either linked with three-dimensional CAD for preparing three-dimensional geometry data on the computer 1, or, without linkage with three-dimensional CAD, merely configured to read necessary CAD data from a database under instructions from the computer 1 before causing the retrieved CAD data to be displayed on the screen display unit of the computer 1.

And if the input unit of the computer 1 is operated to move the cursor onto a given component in the CAD diagram displayed on the screen display unit of the computer 1 and make some kind of input for example, the CAD diagram display control unit 20 selects the component in question as a design-changed component (with selection means) and highlights that component (with third relevant information display control means). Specifically, as shown in FIG. 17 for example, a design-changed component "component E" in the CAD diagram may be highlighted by changing its display color to a predetermined first color (to be more precise, a color different from the usual display color).

Then based on the data stored in the component network database 9, the CAD diagram display control unit 20 acquires relevant components related to the design-changed component, and calculates the importance of each of the relevant components (with importance calculation means). Specifically, a search is first made through the data stored in the relevant information database 7 for failure events including the name of a given relevant component as either the name of a tier-one component or that of a tier-two component, and the sum total "a" of the influence rates of the failure events is calculated. And the total number "b" of the components related to the relevant component in question is calculated based on the data stored in the component network database 9. Then the importance of the relevant component is calculated by integrating the sum total "a" of the influence rates and the number "b" of the components.

Incidentally, the importance may be calculated by weighting the above-mentioned values "a" and "b". The importance may also be calculated by replacing the total number "b" of the components related to the relevant component with a number "b'" of components obtained by subtracting the number of the design-changed component from the total number "b".

And the CAD diagram display control unit 20 highlights the relevant components in the CAD diagram in a graduated manner reflecting their importance (with third relevant information display control means). Specifically, as shown in FIG. 17 for example, relevant components "component F" and "component G" are highlighted using five-graduated colors (to be more precise, a second through a sixth color which differ from the above-mentioned normal display color and first color and which have been predetermined in accordance with the grades of importance). Alternatively, the importance of each relevant component (in numerical value) may be displayed near the name of the component.

In addition to the above-described display function, the CAD diagram display control unit 20 possesses other display capabilities. For example, when the designer operates the input unit of the computer 1 to move the cursor onto a component in the CAD diagram displayed on the screen display unit of the computer 1, the CAD diagram display control unit 20 searches the data stored in the relevant information database 7 for a failure event including the name of the component of interest as the name of a tier-one component, and reads the event name of the failure and the countermeasure against the failure from the searched failure event. And as shown in FIG. 17, the event name and countermeasure thus read are displayed in the CAD diagram (by fourth relevant information display control means).

This embodiment, configured as described above, thus provides advantageous effects similar to those of the first embodiment discussed earlier.

With the second embodiment discussed above, it was explained for example that the CAD diagram display control unit 20 has the function of displaying the event name of a failure and the countermeasure against the failure in the CAD diagram. Alternatively, that function may not be provided. In this case, there is no need for the relevant information extraction unit 6 to extract countermeasures from the failure event documents 11 or for the data in the relevant information database 7 to include event names and countermeasures. With this variation, as with the second embodiment above, it is also possible to fully keep tabs on the components that can fail following the design change of a given component.

Figure 18:
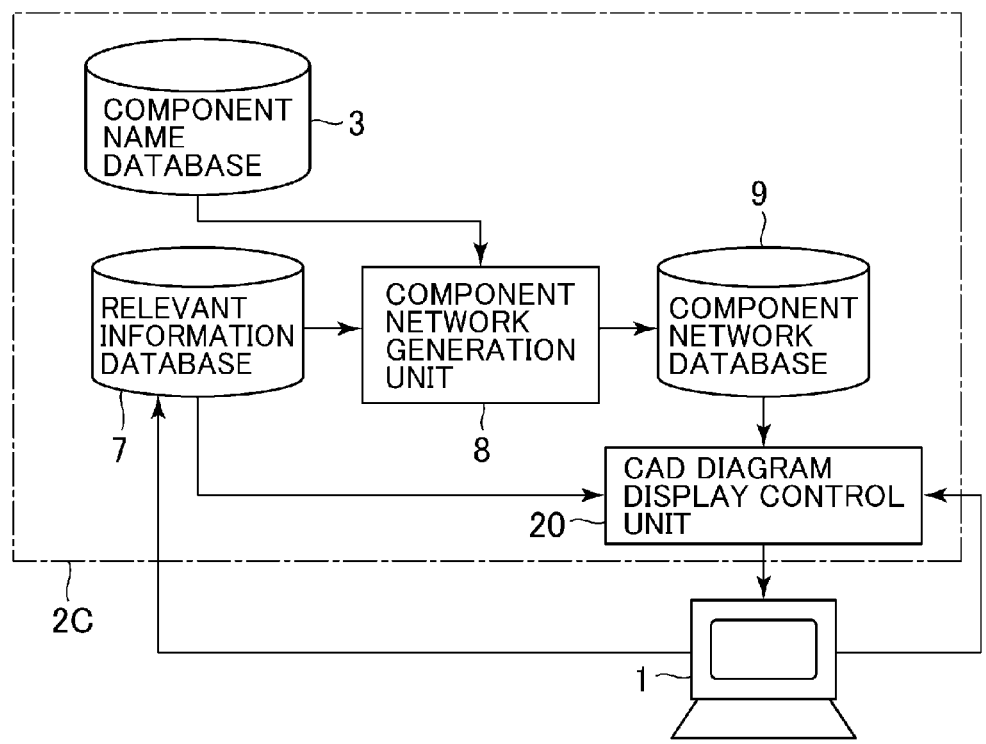
FIG. 18 is a schematic view showing an overall configuration of a design support system as another variation of the present invention.

Also with the second embodiment above, it was explained for example that the design support device 2B is configured to include the event name database 4, failure event database 5, and relevant information extraction unit 6. Alternatively, as with a variation shown in FIG. 18, a design support device 2C may be provided in a manner excluding the event name database 4, failure event database 5, and relevant information extraction unit 6. In this case, the computer 1 or the like may generate the data which is based on the past failure events of the product in question, and which at least includes, in relation to each of the failure events, the name of the tier-one component having failed and the name of the tier-two component having presumably affected the failure of the tier-one component or been affected thereby, and the data thus generated may be stored into the relevant information database 7. With this variation, as with the second embodiment above, it is also possible to fully keep tabs on the components that can fail following the design change of a given component.

DESCRIPTION OF REFERENCE NUMERALS

1 Computer
3 Component name database
4 Event name database
5 Failure event database
6 Relevant information extraction unit (relevant information extraction means)
7 Relevant information database
8 Component network generation unit (component network generation means)
9 Component network database
10 Component network diagram display control unit (component network diagram display control means, first relevant information display control means, selection means, importance calculation means, and second relevant information display control means)
11 Failure event document
12 Design document
20 CAD diagram display control unit (selection means, importance calculation means, third relevant information display control means, and fourth relevant information display control means)

The invention claimed is:

1. A design support system for presenting components to be affected by design change of a component in an existing product, said design support system comprising:
   a component name database which stores the names of components making up the product;
   a relevant information database which stores data which is generated based on past failure events of the product, the data at least including, in relation to each of the failure events, the name of a tier-one component having failed and the name of a tier-two component having presumably affected the failure of the tier-one component or been affected thereby;
   a component network generator which, based on the data stored in said component name database and said relevant information database, generates data of a component network covering the names of the components making up the product as well as relevance between these components;
   a component network database which stores the data generated by said component network generator; and
   a component network diagram display controller which reads data from said component network database and causes a screen display unit to display a component network diagram based on the read data.

2. The design support system according to claim 1, further comprising:
   an event name database which stores the event names of failures that may occur in product components;
   a failure event database which stores failure event documents each describing, in relation to each of the past failure events having occurred in the product, the name of the tier-one component having failed, the event name of the failure, the name of the tier-two component having presumably affected the failure of the tier-one component or been affected thereby, an influence rate indicative of the scope of damage caused by the failure, and a countermeasure against the failure; and
   a relevant information extractor which, from each of the failure event documents stored in said failure event database, extracts the event name of the failure by matching the data stored in said event name database, extracts the names of the tier-one and tier-two components by matching the data stored in said component name database, and further extracts the influence rate and the countermeasure against the failure so as to generate data having, in relation to each of the failure events, the event name of the failure, the name of the tier-one component, the name of the tier-two component, the influence rate, and the countermeasure against the failure;

wherein said relevant information database stores the data generated by said relevant information extractor.

3. The design support system according to claim 2, further comprising a first relevant information display controller which, if any one of the names of the components displayed in said component network diagram is selected, searches the data stored in said relevant information database for the failure events including the selected component name as the name of a tier-one component, and displays in said component network diagram the event name of the failure in the searched failure events and the countermeasure against the failure.

4. The design support system according to claim 2, further comprising:

a selector which selects a design-changed component;

an importance calculator which acquires the components relevant to the design-changed component selected by said selector on the basis of the data stored in said component network database so as to calculate the importance of each of the relevant components; and a second relevant information display controller which highlights in said component network diagram the name of the design-changed component selected by said selector, and displays the names of said relevant components related to the design-changed component in a gradually highlighted manner in accordance with the importance calculated by said importance calculator.

5. The design support system according to claim 4, wherein said selector matches the name of the component described in a design document currently displayed on said screen display unit against the data stored in said component name database so as to extract selectively the matched component as the design-changed component.

6. The design support system according to claim 5, wherein, for each of said relevant components, said importance calculator searches the data stored in said relevant information database for the failure events including the name of said relevant component as either the name of the tier-one component or the name of the tier-two component so as to calculate a sum total "a" of the influence rates of the searched failure events;

calculates a total number "b" of the components relevant to said relevant component based on the data stored in said component network database;

uses a text vector of the failure event document including the name of said relevant component as either the name of the tier-one component or the name of the tier-two component and a text vector of the design document currently displayed on said screen display unit so as to calculate a similarity "c" between the failure event document and the design document, or to calculate a similarity average "c'" if a plurality of similarities "c" are obtained because there exist a plurality of failure event documents; and calculates the importance of said relevant component by integrating the sum total "a" of the influence rates thereof, the number of the components "b", and the similarity "c" or similarity average "c'".

7. The design support system according to claim 4, wherein said selector selects the design-changed component from said component network diagram.

8. The design support system according to claim 7, wherein, for each of said relevant components, said importance calculator searches the data stored in said relevant information database for the failure events including the name of said relevant component as either the name of the tier-one component or the name of the tier-two component so as to calculate a sum total "a" of the influence rates of the searched failure events;

calculates a total number "b" of the components relevant to said relevant component based on the data stored in said component network database; and calculates the importance of said relevant component by integrating the sum total "a" of the influence rates thereof and the number of the components "b".

9. A design support system for presenting components to be affected by design change of a component in an existing product, said design support system comprising:

a component name database which stores the names of components making up the product;

a relevant information database which stores data which is generated based on past failure events of the product, the data at least including, in relation to each of the failure events, the name of tier-one component having failed and the name of tier-two component having presumably affected the failure of the tier-one component or been affected thereby, and an influence rate indicative of the scope of damage caused by the failure;

a component network generator which, based on the data stored in said component name database and said relevant information database, generates data of a component network covering the names of the components making up the product as well as relevance between these components;

a component network database which stores the data generated by said component network generator;

a selector which selects a design-changed component in a CAD Diagram displayed on a screen display unit;

an importance calculator which acquires the components relevant to the design-changed component selected by said selector on the basis of the data stored in said component network database so as to calculate the importance of each of the relevant components; and a third relevant information display controller which highlights in said CAD diagram the design-changed component selected by said selector, and displays said relevant components related to the design-changed component in a gradually highlighted manner in accordance with the importance calculated by said importance calculator.

10. The design support system according to claim 9, further comprising:

an event name database which stores the event names of failures that can potentially occur in components of a product;

a failure event database which failure event documents each describing, for each of past failure events, the name of the tier-one component having failed, the event name of the failure, the name of the tier-two component having presumably affected the failure of the tier-one component or been affected thereby, an influence rate indicative of the scope of damage caused by the failure, and a countermeasure against the failure; and a relevant information extractor which, from each of the failure event documents stored in said failure event database, extracts the event name of the failure by matching the data stored in said event name database, extracts the names of the tier-one and tier-two components by matching the data stored in said component name database, and further extracts the influence rate and the countermeasure against the failure so as to generate data having, in relation to each of the failure events, the event name of the failure, the name of the tier-one component, the name of the tier-two component, the influence rate, and the countermeasure against the failure;

wherein said relevant information database stores the data generated by said relevant information extractor.

11. The design support system according to claim 10, further comprising fourth relevant information display controller which, if either the name of the design-changed component or the name of one of the relevant components displayed in said CAD diagram is selected, searches the data stored in said relevant information database for the failure events including the selected component name as the name of a tier-one component, and displays in said CAD diagram the event name of the failure in the searched failure events and the countermeasure against the failure.

12. The design support system according to claim 9, wherein, for each of said relevant components, said importance calculator searches the data stored in said relevant information database for the failure events including the name of said relevant component as either the name of the tier-one component or the name of the tier-two component so as to calculate a sum total "a" of the influence rates of the searched failure events;

calculates a total number "b" of the components relevant to said relevant component based on the data stored in said component network database; and calculates the importance of said relevant component by integrating the sum total "a" of the influence rates thereof and the number of the components "b".

13. The design support system according to claim 3, further comprising:

a selector which selects a design-changed component;

an importance calculator which acquires the components relevant to the design-changed component selected by said selector on the basis of the data stored in said component network database so as to calculate the importance of each of the relevant components; and a second relevant information display controller which highlights in said component network diagram the name of the design-changed component selected by said selector, and displays the names of said relevant components related to the design-changed component in a gradually highlighted manner in accordance with the importance calculated by said importance calculator.

14. The design support system according to claim 10, wherein, for each of said relevant components, said importance calculator searches the data stored in said relevant information database for the failure events including the name of said relevant component as either the name of the tier-one component or the name of the tier-two component so as to calculate a sum total "a" of the influence rates of the searched failure events;

calculates a total number "b" of the components relevant to said relevant component based on the data stored in said component network database; and calculates the importance of said relevant component by integrating the sum total "a" of the influence rates thereof and the number of the components "b".

15. The design support system according to claim 11, wherein, for each of said relevant components, said importance calculator searches the data stored in said relevant information database for the failure events including the name of said relevant component as either the name of the tier-one component or the name of the tier-two component so as to calculate a sum total "a" of the influence rates of the searched failure events;

calculates a total number "b" of the components relevant to said relevant component based on the data stored in said component network database; and calculates the importance of said relevant component by integrating the sum total "a" of the influence rates thereof and the number of the components "b".

* * * * *